United States Patent [19]
Ahearn et al.

[11] Patent Number: 5,661,291
[45] Date of Patent: Aug. 26, 1997

[54] AUDIO PROOF OF DELIVERY SYSTEM AND METHOD

[75] Inventors: Kevin John Ahearn, Matthews; Frederick M. Weaver, Charlotte, both of N.C.; James M. DeArras; Vernon L. Stant, both of Richmond, Va.; James A. Trautwein, Charlotte, N.C.

[73] Assignee: Hand Held Products, Inc., Charlotte, N.C.

[21] Appl. No.: 477,875

[22] Filed: Jun. 7, 1995

[51] Int. Cl.$^6$ .................................................. G06K 7/10
[52] U.S. Cl. ............................................ 235/472; 235/462
[58] Field of Search ...................................... 235/472, 462

[56] References Cited

U.S. PATENT DOCUMENTS

| | | |
|---|---|---|
| 4,912,466 | 3/1990 | Call . |
| 5,126,543 | 6/1992 | Bergeron et al. . |
| 5,465,291 | 11/1995 | Barros et al. ........................ 235/375 |

*Primary Examiner*—Harold Pitts
*Attorney, Agent, or Firm*—Bell, Seltzer, Park & Gibson

[57] ABSTRACT

A portable item tracking unit includes a bar code reader for capturing a bar code related to an item, a microphone for capturing an audio identification from a recipient of an item, and a memory. The memory associatively electronically stores a digital signal related to the audio identification along with a digital representation of bar code data to provide audio proof of delivery of the item. A display and a speaker may respectively display the stored bar code related to the item and audibly broadcast the electronically stored audio identification for the item. A user input is preferably included for verifying that the input of the bar code and the audio identification is satisfactory. A transferring circuit transfers the electronically stored bar code and the electronically stored audio identification to a host computer. The host computer includes its own memory for associatively storing a plurality of digital identification indicia having a respective plurality of digital audio identifications for a corresponding plurality of items. A consumer can then access the host computer via a telephone network. After the host computer accepts selection of an item, a reconstruction circuit converts the digital identification indicia and the digital audio identification for the selected item into first and second audible messages. A transmitter may then transmit the first and second audible messages to provide audio proof of delivery of the item.

44 Claims, 5 Drawing Sheets

5,661,291

AUDIO PROOF OF DELIVERY SYSTEM AND METHOD

FIELD OF THE INVENTION

This invention relates to item tracking systems and methods and more particularly to electronic systems and methods for tracking items.

BACKGROUND OF THE INVENTION

The volume and success of delivery giants such as Federal Express Corporation, United Parcel Service, and others demonstrate how vital delivery service is to both the business community and individuals. Businesses have grown to rely on delivery companies to carry all types of documents and packages, collectively referred to herein as "items." A guarantee of on time delivery is key to the success of most of the private carriers. Some companies guarantee delivery before specific times on the delivery day, e.g., before 10:00 am, before 4:00 pm, etc. As a result of these delivery guarantees, sophisticated item tracking systems have been developed. Tracking systems benefit both the delivering company and the consumer by identifying the whereabouts of an item at all points along the delivery route.

Tracking systems often use portable tracking units to log receipt and delivery of an item. Two portable tracking units are the Microwand® scanner and Laserwand® scanner marketed by Hand Held Products, Inc. of Charlotte, N.C., the assignee of the present application. The Microwand® scanner and Laserwand® scanner allow a central or host computer to track items by individually scanning them at certain waypoints on the delivery route. For example, upon receipt of an item, a courier can use a Microwand® scanner or Laserwand® scanner to scan a bar code on the item and enter the time of pickup into the scanning unit's memory. The bar code and other data may be transferred to a host computer. The host computer receives information throughout the delivery route and can verify where the item should be along the way. The item is also typically scanned at the time of delivery, verifying that the item has successfully reached its destination.

A signature is commonly obtained from the recipient when an item is delivered to indicate the item's receipt. This signature verification is called "proof of delivery" in the delivery industry. In a typical delivery, proof of delivery provides evidence that the item has been successfully delivered. The delivery could be to the intended party or to the custody of a party on behalf of the intended recipient.

The recipient's signature may be digitized and electronically stored. Electronic storage allows consumers to receive proof of the delivery's acceptance in written form or by electronic confirmation. One problem with capturing a signature, either in a physical or electronic form, is that signatures are often illegible. A person's signature is often written illegibly because they are in a hurry, or have developed a signing style which does not properly represent the letters in their name. Signatures captured on paper records suffer the additional hazard of potentially getting lost or misplaced. In many instances, however, proof of delivery may be accomplished by simply producing the recipient's name, or some other identifying information, without necessitating such physical evidence as a signature. For example, the Federal Express Corporation satisfies a large percentage of their proof of delivery requests telephonically with human operators. There still remains, however, an uncomfortable level of deniability using electronic or written reports as proof of delivery. That is, a recalcitrant party can comfortably deny receiving an item without sufficient evidence to prove otherwise.

SUMMARY OF THE INVENTION

It is therefore an object of this invention to provide an improved electronic item tracking system and method.

It is another object of this invention to provide an improved proof of delivery system and method.

These and other objects are provided by an audio proof of delivery system and method which replaces or supplements a recipient's signature with a spoken message. The spoken message is captured along with other item identification indicia and can be replayed to provide an audio proof of delivery.

A portable tracking unit of the item tracking system has three primary components. First, an identification indicia capture device, such as a bar code reader, captures or obtains identification indicia related to an item. If the identification indicia is a bar code, then it can be captured by a bar code reader and converted into a digital representation of bar code data. The digital bar code data may then be compressed to maximize memory capacity.

The second component is a voice verification capture apparatus which captures or obtains an audio identification from a recipient of the item. The voice verification capture apparatus may be a microphone which converts the audio identification into an electrical signal. An analog to digital converter can convert the electrical signal into a digital electrical signal. As with the identification indicia data, the digital electrical signal data also may be compressed to maximize memory capacity.

The third component is a first memory which stores the obtained identification indicia and the obtained audio identification to provide audio proof of delivery of the item. In the preferred embodiment, the first memory associatively stores the digital electrical signal and the digital bar code data, so that they are linked together in the memory.

The portable tracking unit preferably includes a transfer circuit for transferring both the stored digital representation of the identification indicia and the stored digital representation of the audio identification to a host computer. Other components may also be included. For example, a display can present the stored identification indicia related to the item, and a speaker can audibly broadcast the electronically stored audio identification of the recipient of the item. A user input means, such as a keyboard, is preferably included with the portable tracking unit for verifying that the input of the identification indica and the audio identification are satisfactory. The term "user" is meant to describe the individual carrier or delivery person who uses the portable tracking unit in the transfer of items.

The host computer includes a second memory for associatively electronically storing a plurality of digital representations of identification indicia, with a respective plurality of digital representations of audio identifications, for a corresponding plurality of items. A telephone and a telephone network, i.e., data communications, preferably serve as a means for accepting consumer selection of one of the plurality of items. A reconstruction circuit, responsive to consumer selection, converts the digital identification indicia data and the digital audio identification data into first and second audible messages. A transmitter may then transmit the first and second audible messages to the consumer to provide audio proof of delivery of the item.

An item tracking method according to the invention obtains identification indicia related to an item. The identification indicia related to the item is then electronically stored. A recipient of the item is then prompted to speak an audible identification message. The spoken audible identification message is electronically stored to provide audio proof of delivery for the item. The step of obtaining identification indicia related to an item may include capturing a bar code associated with the item and converting the captured bar code into a digital representation of bar code data.

After prompting a recipient of the item to speak an audible identification message, the audible identification message is converted to an electrical signal which itself is transformed into a digital electrical signal. The electronic storing of the identification indicia and the identification message is preferably an associative electronic storing of the digital representation of the bar code data and the digital electrical signal representing the identification message. To maximize memory use, the method may include the step of compressing the digital electrical signal and the step of compressing the digital bar code data. After storing the relevant data, the stored identification indicia related to the item may be displayed, and the stored audio identification of the recipient for the item may be audibly broadcast. A user may then verify that the input of both the identification indica and the audio identification is satisfactory.

The method preferably includes the steps of transferring the electronically stored identification indicia related to the item and transferring the electronically stored audio identification message of the recipient to a host computer. The host computer then associatively electronically stores a plurality of digital representations of identification indicia, with a respective plurality of digital representations of audio identifications, for a corresponding plurality of items. The host computer may accept selection of one of the plurality of items, for example, telephonically. Thus, the host computer may accept telephone keypad information identifying one of the plurality of items. After selection of an item, the host computer converts the digital representation of the identification indicia and the digital representation of the audio identification, for the selected item, into first and second audible messages. A transmitter then transmits the first and second audible messages to provide audio proof of delivery of the item.

Thus, the invention permits the digital recording of an audio identification and provides an audio proof of delivery to a consumer via a telephone without requiring operator intervention. The audio recording is sufficient to identify the receiving party and perhaps the company whom the party represents. Dependable audio proof of delivery adds a new layer of integrity and security to the item delivery industry.

BRIEF DESCRIPTION OF THE DRAWINGS

The foregoing and other objects, advantages, and features of the invention, and the manner in which the same are accomplished, will become more readily apparent upon consideration of the following detailed description of the invention taken in conjunction with the accompanying drawings, which illustrate preferred and exemplary embodiments, and wherein.

DETAILED DESCRIPTION

The present invention will now be described more fully hereinafter with reference to the accompanying drawings in which preferred embodiments of the invention are shown. This invention may, however, be embodied in many different forms and should not be construed as limited to the illustrated embodiments set forth herein; rather, these illustrated embodiments are provided so that this disclosure will be thorough and complete and will fully convey the scope of the invention to those skilled in the art. Like numbers refer to like elements throughout.

Figure 1A:
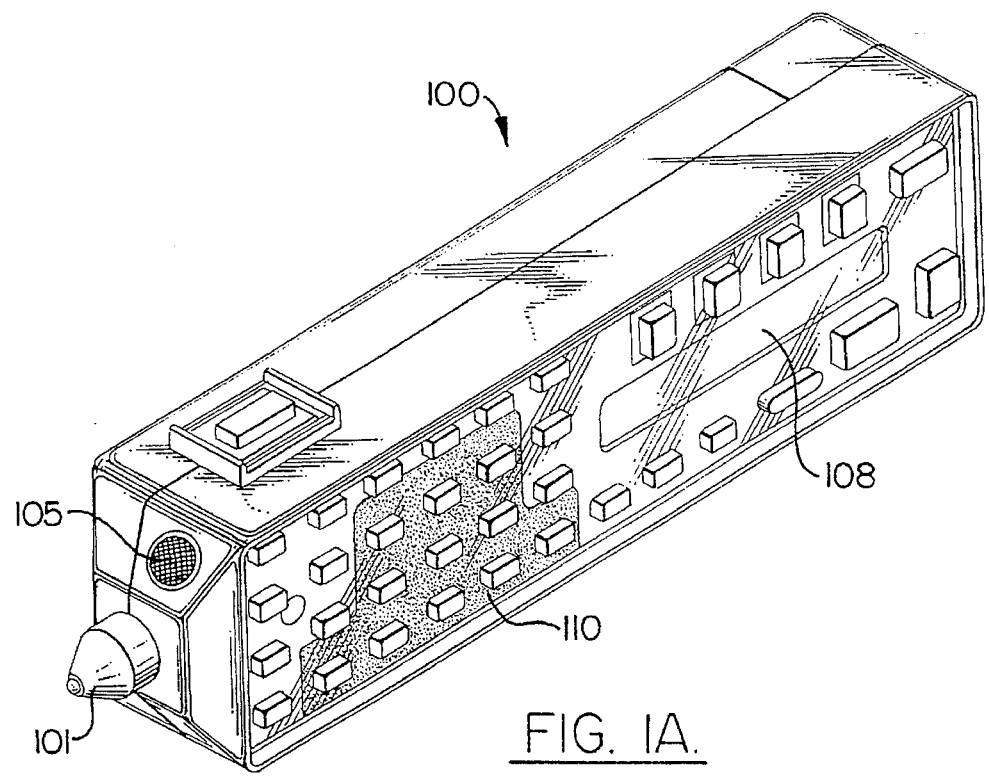
FIGS. 1A and 1B illustrate perspective views of a Microwand® scanner incorporating the present invention.
Figure 1B:
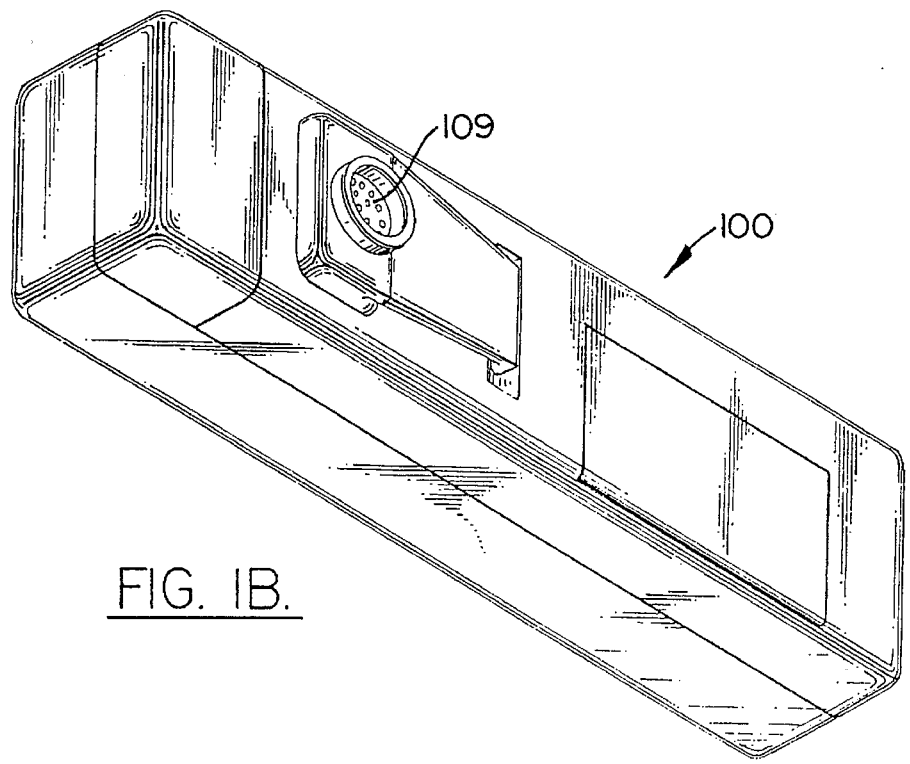
Figure 2:
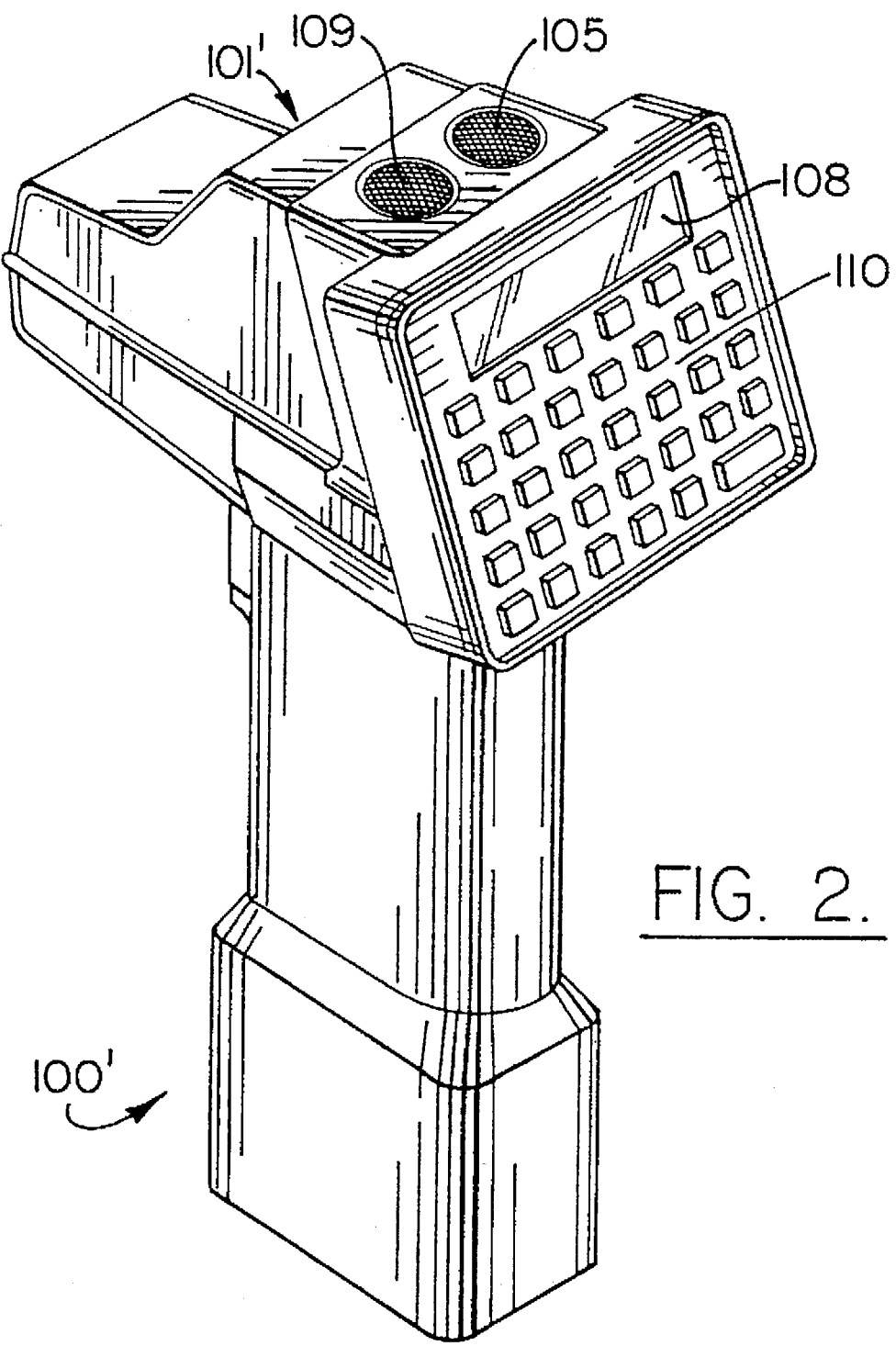
FIG. 2 illustrates a perspective view of a Laserwand® scanner incorporating the present invention.
Figure 3:
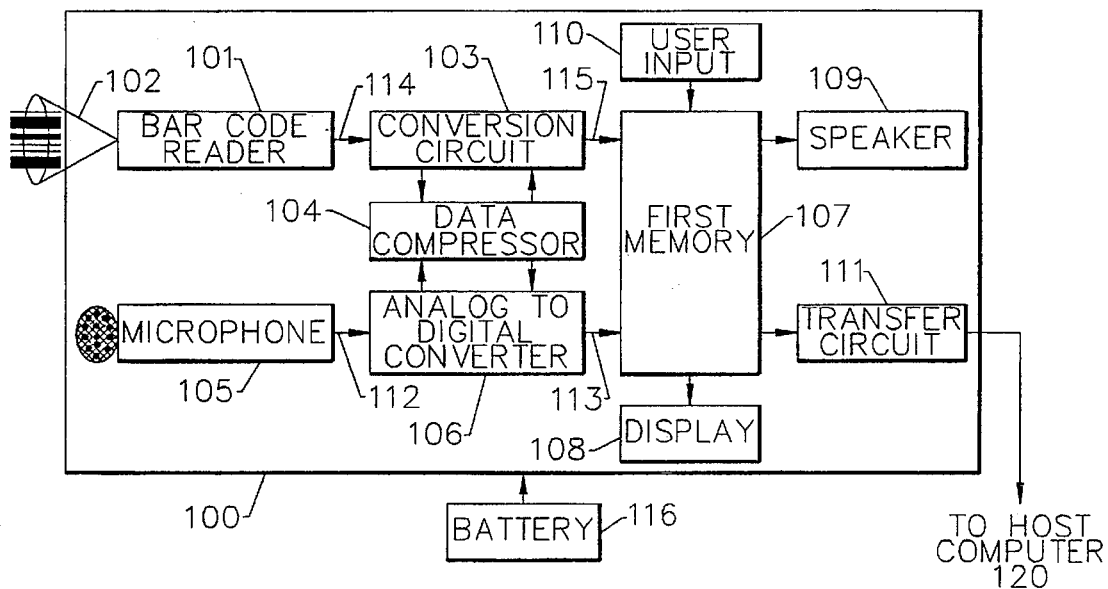
FIG. 3 illustrates a hardware block diagram of a portable data capture unit according to the invention.

FIGS. 1A and 1B illustrate a portable tracking unit 100 of an item tracking system according to the invention. The portable tracking unit 100 of FIGS. 1A and 1B is a modified Microwand® scanner marketed by Hand Held Products, Inc. in Charlotte, N.C. An alternative embodiment of the portable tracking unit 100', illustrated in FIG. 2, is a modified Laserwand® scanner also marketed by Hand Held Products, Inc. As depicted in FIG. 3, the portable tracking unit 100 includes an identification indicia capture device, e.g., a bar code reader 101, for obtaining identification indicia, such as a bar code 102, related to an item. Of course, the identification indicia need not be limited to a bar code 102. In other embodiments, the invention may use two dimensional or other multi-dimensional identification indicia, numerical codes, or the like. Bar codes, and bar code scanners, are used throughout the present application because of their nearly universal acceptance and use in the delivery industry.

Preferably, the bar code reader 101 captures a bar code 102 associated with an item and conveys an electrical signal, representing the reflectivity of the various light and dark "bars" of the bar code, on line 114 to a conversion circuit 103. The conversion circuit 103, i.e., first converter, is electrically connected to the bar code reader 101 and converts the captured bar code 102 into digital bar code data. More specifically, the conversion circuit 103 converts the captured bar code 102 into a digital representation of bar code data on line 115. A data compressor 104 may then compress the digital representation of bar code data to optimize energy used in transferring data and digital storage. The design and operation of the bar code reader 101, the conversion circuit 103, and the data compressor 104 are well known to those with skill in the art and need not be discussed further herein.

In addition to the identification indicia capture device, a voice verification capture apparatus, such as a microphone 105, or other audio transducer, preferably is used for capturing or obtaining an audio identification from a recipient of the item. The microphone 105 is one means for converting the audio identification into an electrical signal on line 112. The electrical signal may then be passed to an analog to digital converter 106, i.e., a second converter, for converting the electrical signal into a digital electrical signal on line 113. As with the digital representation of bar code data, the data compressor 104 may compress the data of the digital electrical signal. The design and operation of the microphone and the analog to digital converter 106 are well known to those having skill in the art and need not be described further herein.

A first memory 107 stores the obtained identification indicia related to the item and the obtained audio identification from the recipient of the item to provide audio proof of delivery of the item. The preferred storage of information in the first memory 107 is an associative storing of the digital electrical signal and the digital representation of bar code data. In other words, bar code data and the audio identification tendered upon receipt of an item are electronically stored in such a way as to be linked together to facilitate an audio proof of delivery. Associative storage may use pointers, tables, links, or other well known techniques to link the item identification indicia and the audio identification and need not be described further herein.

After bar code and audio identification information are stored in the memory 107, a display 108 can visually display the electronically stored identification indicia related to the item. The display 108 can be of any variety, including LCD or LED displays, but is preferably a low power LCD display. A speaker 109 is preferably provided for audibly broadcasting the electronically stored audio identification. Thus, after scanning a bar code 102 and storing an audio identification, the display 108 and speaker 109 can confirm proper storage of the relevant information. User input means, such as a keyboard 110, or other user interface, is electrically connected to the first memory 107 so that a user can verify that the input of the identification indicia and the audio identification is satisfactory. It will be understood that operations of the keyboard 110 are typically controlled by a controller, such as a microprocessor (not shown) having predetermined command through a combination of hardware and software configurations and arrangements, the design and operation of which are well known to those having skill in the art. A battery 116 supplies power to the various components of the portable tracking unit 100.

A transferring circuit 111, e.g., a transmitter, transceiver, or the like, may transfer the electronically stored identification indicia related to the item and the electronically stored audio identification of the recipient to a host computer 120. The transfer may be telephonic, radio frequency, or other means available to those skilled in the art. For example, the portable tracking unit 100 could periodically transmit real time information to a carrier vehicle which then responds to central polling from a base station, i.e., tracking system, with its own radio frequency transmission of data. Alternatively, when an individual carrier returns to his or her carrier vehicle and places the portable tracking unit 100 in a receiving stand, the unit may download its stored information into the receiving stand for later retrieval.

Figure 4:
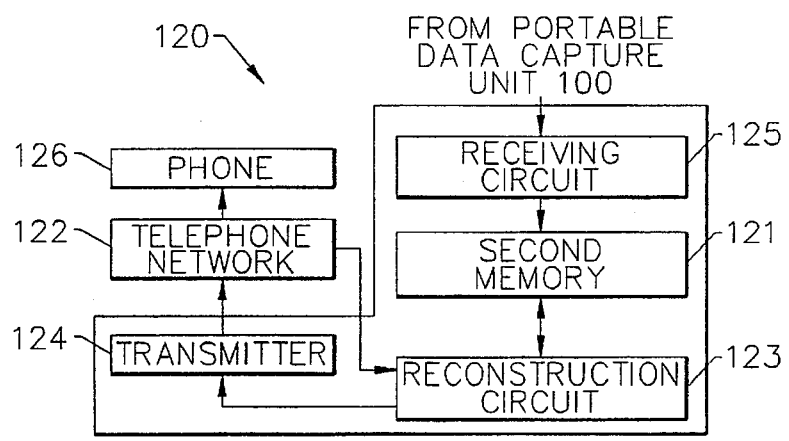
FIG. 4 illustrates a system block diagram of a host computer according to the invention.

The host computer 120, illustrated in FIG. 4, receives the digitally transferred information through a receiving circuit 125. The receiving circuit 125 then transfers the received digital information to a second memory 121. The second memory 121 is provided for associatively electronically storing a plurality of digital representations of identification indicia, with a respective plurality of digital representations of audio identifications, for a corresponding plurality of items. The public is then able to access the host computer 120 to verify item delivery. Accordingly, a consumer selection accepting means, which could be a telephone 126 and a telephone network 122, is used for accepting consumer selection of one of the plurality of items.

A reconstruction circuit 123 is responsive to the consumer selection means for converting the digital identification indicia for the consumer selected item into a first audible message. Also, the reconstruction circuit 123 converts the digital representation of the audio identification into a second audible message. It will be understood that operations of the host computer 120 are typically controlled by a controller, such as a microprocessor (not shown) as described above herein, the design and operation of which is well known to those having skill in the art. A transmitter 124 connected between the reconstruction circuit 123 and the telephone network 122, i.e., data communications network, can then transmit the first and second audible messages to the consumer over the consumer's telephone 126 to provide audio proof of delivery of the item.

Figure 5:
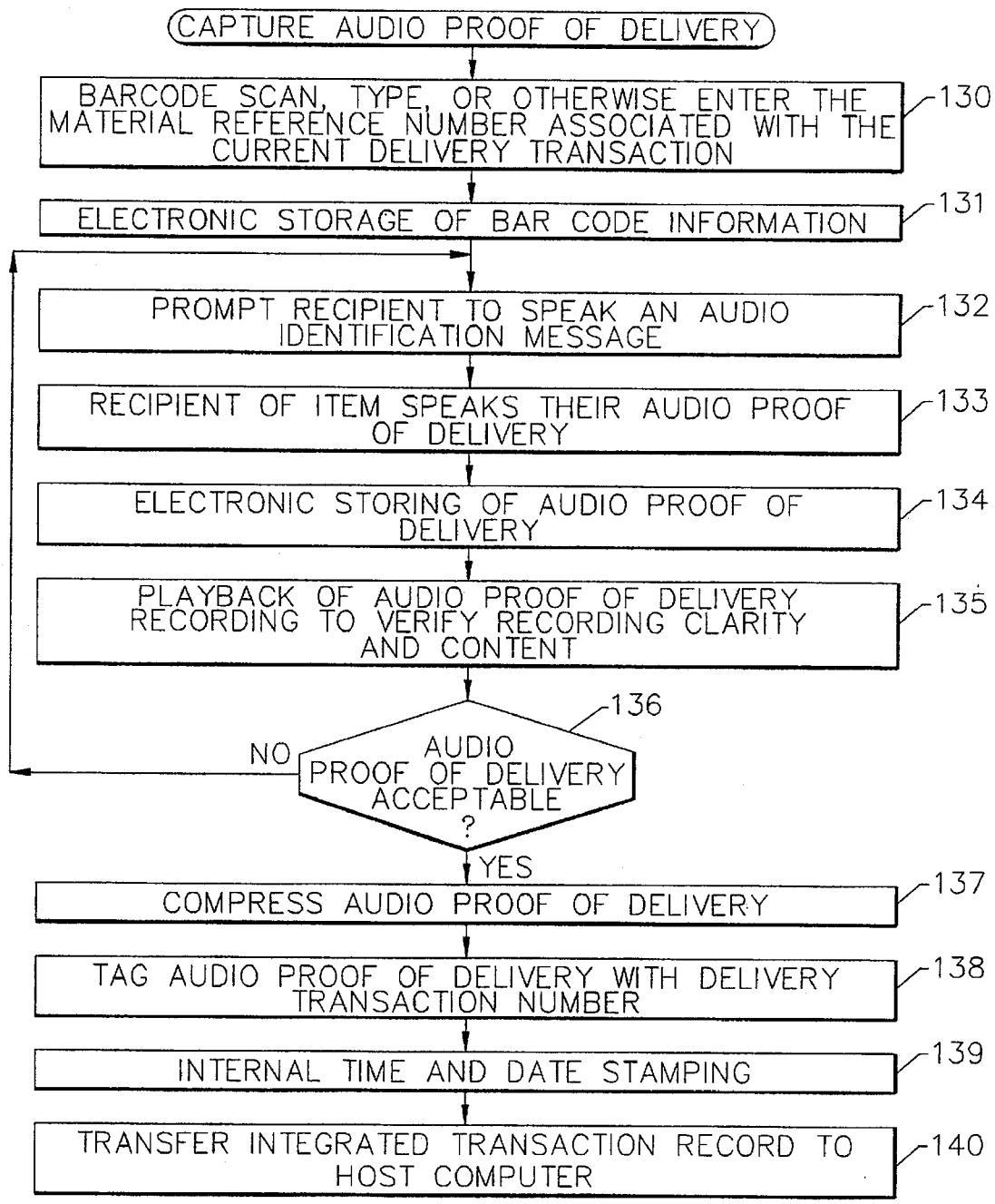
FIG. 5 is a flowchart illustrating operations of the portable data capture unit illustrated in FIG. 3.

Referring now to FIG. 5, operation of an item tracking system using the portable item tracking unit 100 to capture an audio proof of delivery is disclosed. The first step, at Block 130, is obtaining identification indicia related to an item. This can involve bar code scanning, operator input, or otherwise selecting the reference number associated with the item involved in the current delivery transaction. These operations are well known to those having skill in the art. The next step, as indicated at Block 131, is electronically storing a representation of the identification indicia related to the item in the first memory 107. The reference number will become a lookup key for subsequent transaction data retrieval. The stored bar code information need only be a digital representation of bar code data that is sufficient to catalog the item in question. The stored identification indicia related to the item may then be displayed on display 108 for review or approval. In addition, the digital representation of bar code data may be compressed in data compressor 104 to maximize memory storage.

By triggering the portable unit 100, either by key depression, voice activation, or other means understood by those in the art, an application program will begin recording the audio information that constitutes the audio proof of delivery. Thus, as indicated at Block 132, a recipient of the item must be prompted to speak an audible identification message. Recording may continue, for example, until the depressed key is released or after five seconds, whichever occurs first. The time limit is configurable depending on available memory.

The recipient of the item speaks an audio proof of delivery, at Block 133, which may include their name and their company name, into the microphone 105 of the portable unit 100. As the spoken audio identification information is received, the portable tracking unit 100 digitizes the information and electronically stores it in the first memory 107, as shown by Block 134, to provide audio proof of delivery for the item. Accordingly, the audio identification message is converted into an electrical signal, which in turn is converted into a digital electrical signal for storage.

After the audio recording is complete, the recording device plays back the entire recording to verify recording clarity and content, as indicated by Block 135. Block 136 indicates that the user accepts or rejects, by keyboard selection, the audio recording input. If the audio recording is unacceptable, then the audio recording is erased from memory and a new audio recording may be created at the prompt of Block 132. The digital electrical signal representing the audio recording may then be compressed, as shown at Block 137, so that the least amount of storage memory is used in the portable unit 100. The choice of compression techniques depends on the portable unit and any subsequent platforms that will receive, playback, store, or otherwise utilize the audio recording.

The electronic storing of the identification indicia and the audio identification message is an associative storing of the digital electrical signal and the digital representation of bar code data, as seen at Block 138. The compressed digitized audio recording is tagged with the same or a related data identifier to relate the audio recording with the current delivery transaction number(s). Thus, multiple items picked up or delivered from one location may only require a single audio proof of delivery for the entire pick up or delivery. Then, as shown at Block 139, the time and date that the transaction record is completed may be retrieved from the portable tracking unit's internal clock (not shown) for time stamping of the integrated record. The data for the current transaction, including item identification, audio recording, and other relevant information, as appropriate for the application, preferably are either stored in the first memory 107 such that they may be subsequently recalled as an integral transaction and replayed via the speaker 109 and display 108 or communicated as real time information to the host computer 120.

The last operation, at Block 140, is transferring the electronically stored representation of the identification indicia along with the electronically stored audio identification message as an integrated record to the host computer 120. As discussed above, the transfer of information from the portable tracking unit 100 to the host computer 120 may take any known form, for example, via MODEM or RF. The host computer 120 associatively electronically stores a plurality of digital representations of identification indicia, with a respective plurality of digital representations of audio identifications, for a corresponding plurality of items.

Figure 6:
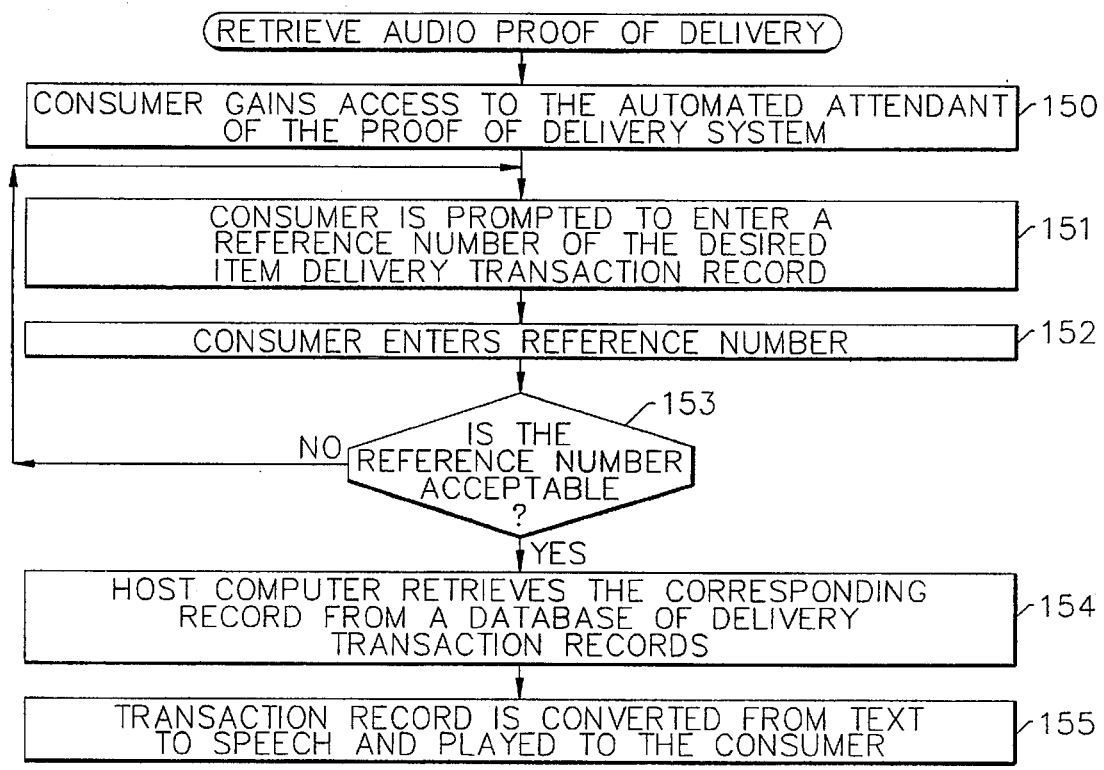
FIG. 6 is a flowchart illustrating operations of the host computer illustrated in FIG. 4.

As illustrated by FIG. 6, operations performed by the host computer 120 to retrieve the audio proof of delivery will now be described. In an unattended audio proof of delivery system, access is provided through an ordinary touch-tone telephone. First, at Block 150, a consumer uses a touch-tone telephone to gain access to an "automated attendant" of the host computer 120. The host computer 120 answers the incoming call and plays a welcome message to indicate that the correct phone number has been reached. After playing the welcome message, the automated attendant guides the consumer through choices that may be selected from the touch-tone telephone keypad.

The automated attendant then requests, at Block 151, that the consumer key enter, through the touch-tone keypad of the telephone, a reference number. For example, the reference number may be an airbill reference number of the desired item delivery transaction record. The consumer is typically requested to press a non-numeric key such as the pound (#) or asterisk (*) key after entering all digits of the airbill reference number to indicate the completion of the data entry process. The consumer therefore enters each digit of the reference number in sequence and presses the requested non-numeric key, as shown at Block 152. Using the DTMF signature of each individual keystroke, the identity of each number is determined. Decoding techniques of this type are well known to those with skill in the art. If the key identity is numeric (0–9), then the value is concatenated with any prior values to build the reference number. If the key identity is determined to be the correct non-numeric key value, then the concatenated value is the reference number and is used to proceed with the item delivery transaction retrieval. Thus, at Block 153, the host computer 120 either accepts or rejects consumer selection of one of the plurality of items. If rejected, the consumer is instructed to reenter the transaction number at Block 151.

With the item reference number, the host computer 120 retrieves the corresponding record from a database of delivery transaction records, as indicated at Block 154. The retrieved delivery transaction record preferably consists of the item reference number, the time and date that the transaction record was created, and the audio recording that constitutes proof of delivery. The host computer then separates, or parses, the transaction record into its unique fields of item reference number, time, date, and compressed audio recording.

As shown at Block 155, the transaction record is converted into an audible format and played to the consumer. To ensure that proof of delivery for the correct transaction is being provided to the consumer, the item reference number text is preferably converted to digital speech and played to the consumer over the telephone connection. The delivery time is also converted from text to speech and played to the consumer. In the text to speech conversion of the time, the numbers and punctuation representing the time may be enhanced to their customary spoken format so that "11:00" may be spoken as "Eleven O'Clock." The date is also converted from text to speech and played to the consumer. In the text to speech conversion of the date, the numbers and punctuation representing the date may be enhanced to their customary spoken format so that "09/20/93" may be spoken as "September twentieth nineteen ninety three." Finally, the compressed audio recording is decompressed to render an audio recording format that may be played. Compression may be used to reduce storage requirements or communication times. The audio recording, now decompressed, is played to the consumer. Text to speech technology is well known to those with skill in the art and is, therefore, not discussed further.

The entire audio proof of delivery heard by the consumer may be similar to:

Item number {insert text to speech item transaction number} was delivered at {insert text to speech time and date} and was received by {insert audio recording which constitutes audio proof of delivery} . . . .

After hearing the audio proof of delivery message, the consumer may be presented with additional options for selecting additional transactions to receive proof of delivery, for speaking with a human operator, or for receiving a written proof of delivery.

The system may be used in an attended mode so that the consumer speaks with a human operator. The human operator uses information provided by the consumer to locate the correct item delivery transaction record. This may be necessary when the consumer does not know the item reference number, the item reference number contains characters that cannot be conveniently entered into the keypad of a touch-tone telephone, or the consumer is calling from other than a touch-tone telephone. Once the human operator has located the correct item delivery transaction record, then the audio proof of delivery may be played to the consumer. The collection of an audio recording for proof of delivery may be in addition to any other proof of delivery methods including, but not limited to, key entry of the recipient's name, digital signature capture, image lifting, bar code scanning, magnetic stripe reading, RF tag reading, or the like.

In the drawings and specification, there have been disclosed illustrated embodiments of the invention and, although specific terms are employed, they are used in a descriptive sense only and not for purposes of limitation, the scope of the invention being set forth in the following claims.

That which is claimed:

1. An item tracking system comprising:

identification indicia capturing means for capturing identification indicia related to an item;

voice verification capturing means for capturing spoken audio identification information spoken by the recipient of the item; and electronic storing means positioned in electrical communication with said identification indicia capturing means and said voice verification capturing means for electronically storing the captured spoken audio identification information spoken by the recipient of the item and the associated captured identification indicia to provide audio proof of delivery of the item.

2. An item tracking system according to claim 1, wherein said identification indicia capturing means comprises bar code reading means for capturing a bar code associated with the item.

3. An item tracking system according to claim 2, wherein said identification indicia capturing means further comprises conversion means electrically connected to said bar code reading means for converting the captured bar code into a digital representation of bar code data.

4. An item tracking system according to claim 1, wherein said voice verification capturing means comprises:

means for converting the audio identification into an electrical signal; and analog-to-digital conversion means electrically connected to said means for converting the electrical signal into a digital electrical signal.

5. An item tracking system according to claim 4, wherein said identification indicia capturing means comprises:

bar code reading means for capturing a bar code associated with the item; and conversion means electrically connected to said bar code reading means for converting the captured bar code into a digital representation of bar code data, and wherein said electronic storing means comprises memory means for associatively storing the digital electrical signal and the digital representation of bar code data.

6. An item tracking system according to claim 5, further comprising compression means for compressing the digital electrical signal, and wherein said memory means stores the compressed digital electrical signal.

7. An item tracking system according to claim 5, further comprising compression means for compressing the digital representation of bar code data, and wherein said memory means stores the compressed digital representation of bar code data.

8. An item tracking system according to claim 1, further comprising:

display means electrically connected to said electronic storing means for displaying the electronically stored identification indicia related to the item; and speaker means electrically connected to said electronic storing means for audibly broadcasting the electronically stored audio identification of the recipient of the item.

9. An item tracking system according to claim 8, further comprising user interface means electrically connected to said electronic storing means interfacing with a user.

10. An item tracking system according to claim 1, further comprising transferring means electrically connected to said electronic storing means for transferring the electronically stored identification indicia related to the item to a host computer and for transferring the electronically stored audio identification of the recipient to a host computer.

11. An item tracking system according to claim 8, further comprising power supply means for supplying power to said identification indicia capturing means, said voice verification capturing means, said electronic storing means, said display means, and said speaker means to thereby produce a portable item tracking system.

12. An item tracking system comprising:

bar code reader for capturing a bar code related to an item;

a first converter electrically connected to said bar code reader for converting the captured bar code into a digital representation of bar code data;

a microphone for obtaining spoken audio identification information spoken by the recipient of the item and for converting the audio identification into an electrical signal;

a second converter electrically connected to said microphone means for converting the electrical signal from said microphone into a digital electrical signal representing the spoken audio identification information spoken by the recipient of the item;

a memory electrically connected to said first and second converters for associatively storing the digital electrical signal representing the spoken audio identification information spoken by the recipient of the item with the digital representation of bar code data related to the item received by the recipient to provide audio proof of delivery of the item;

a display electrically connected to said memory for displaying the stored digital representation of bar code data related to the item; and a speaker electrically connected to said memory for audibly broadcasting the stored digital electrical signal representing the spoken audio identification information spoken by the recipient of the item.

13. An item tracking system according to claim 12, further comprising a user interface electrically connected to said memory for interfacing with a user.

14. An item tracking system according to claim 12, further comprising a transmitter electrically connected to said memory for transmitting the stored digital representation of bar code data to a host computer and for transmitting digital electrical signal related to the recipient to the host computer.

15. An item tracking system according to claim 12, further comprising a power supply for supplying power to said first and second converters, said microphone, said memory, said display, and said speaker to thereby produce a portable item tracking system.

16. An item tracking system comprising:

memory means for associatively storing a plurality of digital representations of identification indicia with a respective plurality of digital representations of audio identifications representing spoken audio identification information spoken by a recipient of an item for a corresponding plurality of items;

selection accepting means for accepting selection of one of the plurality of items;

reconstruction means electrically connected to said memory means and responsive to said selection accepting means for converting the digital identification indicia for the selected item into a first audible message and for converting the digital representation of the audio identification representing the spoken audio identification information spoken by a recipient of the selected item into a second audible message; and transmission means connected to said reconstruction means for transmitting the first and second audible messages to provide audio proof of delivery of the item.

17. An item tracking system according to claim 16, wherein said selection accepting means comprises a telephone, and a telephone network connected between said telephone and said reconstruction means.

11

18. An item tracking system according to claim 16, further comprising a portable tracking unit, said portable tracking unit including:
 identification indicia capturing means for capturing a digital representation of an identification indicia related to an item;
 voice verification capturing means for capturing a digital representation of an audio identification from a recipient of the item;
 electronic storing means for associatively electronically storing the captured digital representation of the identification indicia related to the item with the captured digital representation of the audio identification from the recipient of the item; and
 transferring means electrically connected to said electronic storing means for transferring the electronically stored digital representation of the identification indicia related to the item to said memory means and for transferring the electronically stored digital representation of the audio identification of the recipient to said memory means.

19. An item tracking system according to claim 18, wherein said identification indicia capturing means comprises bar code reading means for capturing a bar code associated with the item.

20. An item tracking system according to claim 19, wherein said identification indicia capturing means further comprises conversion means electrically connected to said bar code reading means for converting the captured bar code into a digital representation of the identification indicia.

21. An item tracking system according to claim 18, further comprising user interface means electrically connected to said electronic storing means for interfacing with a user.

22. An item tracking system according to claim 18, wherein said voice verification capturing means comprises:
 a transducer for converting an audio identification into an electrical signal; and
 an analog to digital converter electrically connected to said transducer for converting the electrical signal into a digital representation of the audio identification.

23. An item tracking system according to claim 16, further comprising compression means for compressing a digital representation of the identification indicia, and wherein said memory means stores the compressed digital representation of the identification indicia.

24. An item tracking system according to claim 16, further comprising compression means for compressing a digital representation of the audio identification, and wherein said memory means stores the compressed digital representation of the audio identification.

25. An item tracking system according to claim 16, further comprising:
 display means electrically connected to said memory means for displaying a stored digital representation of an identification indicia related to an item; and
 audio means electrically connected to said memory means for audibly broadcasting a stored digital representation of an audio identification of the recipient for the item.

26. An item tracking method comprising the steps of:
 obtaining identification indicia related to an item;
 electronically storing a representation of the identification indicia related to the item;
 prompting a recipient of the item to speak an audible identification message; and
 electronically storing the spoken audible identification message to provide audio proof of delivery for the item.

12

27. A method according to claim 26, wherein the step of obtaining identification indicia related to an item comprises the step of capturing a bar code associated with the item.

28. A method according to claim 27, wherein the step of obtaining identification indicia related to an item further comprises the step of converting the captured bar code into a digital representation of bar code data.

29. A method according to claim 26, further comprising the step of verifying that the input of one of the electronically stored identification indicia and the electronically stored audio identification message is satisfactory.

30. A method according to claim 26, wherein the step of prompting a recipient of the item to speak an audible identification message is followed by the steps of:
 converting the audible identification message into an electrical signal; and
 converting the electrical signal into a digital electrical signal.

31. A method according to claim 30, wherein the step of obtaining identification indicia related to an item comprises the steps of:
 capturing a bar code associated with the item; and
 converting the captured bar code into a digital representation of bar code data, and wherein the steps of electronically storing the identification indicia related to the item and electronically storing the spoken audio identification message comprise the step of associatively electronically storing the digital electrical signal and the digital representation of bar code data.

32. A method according to claim 31, wherein prior to the step of associatively electronically storing the digital electrical signal and the digital representation of bar code data the method further comprises the step of compressing the digital electrical signal.

33. A method according to claim 31, wherein prior to the step of associatively electronically storing the digital electrical signal and the digital representation of bar code data the method further comprises the step of compressing the digital representation of bar code data.

34. A method according to claim 26, further comprising the steps of:
 displaying the stored identification indicia related to the item; and
 audibly broadcasting the electronically stored audio identification message of the recipient for the item.

35. A method according to claim 26, further comprising the steps of:
 transferring the electronically stored representation of the identification indicia related to the item to a host computer; and
 transferring the electronically stored audio identification message of the recipient of the item to a host computer.

36. An item tracking method comprising the steps of:
 associatively electronically storing a plurality of digital representations of identification indicia, with a respective plurality of digital representations of audio identifications representing the spoken audio identification information spoken by a recipient of an item, for a corresponding plurality of items;
 accepting selection of one of the plurality of items;
 converting a digital representation of an identification indicia for the selected item into a first audible message;
 converting a digital representation of an audio identification representing the spoken audio identification information spoken by a recipient of the selected item into a second audible message; and transmitting the first and second audible messages to provide audio proof of delivery of the item.

37. A method according to claim 36 wherein the step of accepting selection of one of the plurality of items comprises the step of accepting telephone keypad information identifying one of the plurality items.

38. A method according to claim 36, wherein the associatively electronically storing step is preceded by the steps of:

obtaining a digital representation of an identification indicia related to an item; and obtaining a digital representation of an audio identification from a recipient of the item.

39. A method according to claim 38, wherein the step of obtaining a digital representation of an identification indicia related to an item comprises the step of capturing a bar code associated with the item.

40. A method according to claim 39, wherein the step of obtaining a digital representation of an identification indicia related to an item further comprises the step of converting the captured bar code into a digital representation of the identification indicia.

41. A method according to claim 38, further comprising the step of verifying that the input of one of the electronically stored identification indica and the electronically stored audio identification is satisfactory.

42. A method according to claim 38, wherein the step of obtaining a digital representation of an audio identification from a recipient of the item comprises the steps of:

converting an audio identification into an electrical signal; and converting the electrical signal into a digital representation of the audio identification.

43. A method according to claim 36, wherein prior to the associative electronic storing step, the method further comprises the step of compressing a digital representation of an identification indicia, and wherein the stored plurality of digital representations of identification indicia are compressed digital representations.

44. A method according to claim 36, wherein prior to the associative electronic storing step, the method further comprises the step of compressing a digital representation of an audio identification, and wherein the stored plurality of digital representations of audio identifications are compressed audio identifications.

* * * * *